(12) United States Patent
Wolzien

(10) Patent No.: US 6,233,736 B1
(45) Date of Patent: *May 15, 2001

(54) MEDIA ONLINE SERVICE ACCESS SYSTEM AND METHOD

(75) Inventor: Thomas R. Wolzien, Grandview, NY (US)

(73) Assignee: Media Online Services, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/054,740

(22) Filed: Apr. 3, 1998

Related U.S. Application Data (63) Continuation of application No. 08/597,432, filed on Feb. 8, 1996, now Pat. No. 5,761,606.

(51) Int. Cl.[7] .................................................... H04N 7/173
(52) U.S. Cl. ........................... 725/110; 725/112; 725/133
(58) Field of Search .................................... 348/6, 10, 12, 348/13, 460, 461, 465, 468, 469, 473, 476–479, 563, 564, 565; 455/3.1, 5.1, 6.1, 6.2, 6.3; 709/217–219; 725/105, 109, 110, 111, 112, 113, 131, 133; H04N 7/00, 7/10, 7/14

(56) References Cited

U.S. PATENT DOCUMENTS

| | | |
|---|---|---|
| 4,894,789 | 1/1990 | Yee . |
| 4,905,094 | 2/1990 | Pocock et al. . |
| 5,014,125 | 5/1991 | Pocock et al. . |
| 5,128,752 | 7/1992 | Von Kohorn . |
| 5,140,416 | 8/1992 | Galumbeck et al. . |
| 5,262,860 | * 11/1993 | Fitzpatrick et al. ............. 348/476 X |
| 5,285,278 | 2/1994 | Holman . |
| 5,438,355 | * 8/1995 | Palmer ................................ 455/2 X |

(List continued on next page.)

FOREIGN PATENT DOCUMENTS

| | | |
|---|---|---|
| 19545882 | 6/1997 | (DE) . |
| 0757485 | 2/1997 | (EP) . |
| WO 9413107 | 6/1994 | (WO) . |
| WO960727 | 3/1996 | (WO) . |
| WO9613124 | 5/1996 | (WO) . |
| WO 9702699 | 1/1997 | (WO) . |
| WO9727546 | 7/1997 | (WO) . |

*Primary Examiner*—John W. Miller
(74) *Attorney, Agent, or Firm*—Dorsey & Whitney LLP (57) ABSTRACT

A system is disclosed for providing direct automated access to an online information services provider through an address embedded in a video or audio program, commercial message, or news story. The system operates with video or audio programs which are received through broadcast, cable or pre-recorded media, and which are encoded in either analog or digital formats. The address of an online information provider is encoded in a vertical blanking interval or other non-displayed portion of an electronic signal which represents the video or audio program so as not to interfere with the program as displayed or transduced on a television or audio sound system. The online information provider address is detected and decoded from the electronic signal and used in establishing a direct digital communication link to the online information provider. Upon detecting an online provider address, the system indicates to the user that more information is available. The user may then elect to establish a connection with the online information provider by giving a simple command, e.g., pushing a special button on a remote control. The system then automatically establishes a direct digital communication link to the online information provider through the address and provides for interactive information exchange and processing to permit signals received from the online information provider to be displayed on a conventional television, transduced on a sound system, or also on a high resolution reproducing system such as a computer monitor, or other reproduction device.

12 Claims, 3 Drawing Sheets

U.S. PATENT DOCUMENTS

| | | |
|---|---|---|
| 5,453,794 | 9/1995 | Ezaki . |
| 5,479,268 | 12/1995 | Young . |
| 5,481,542 | 1/1996 | Logston et al. . |
| 5,526,035 | 6/1996 | Lappington et al. . |
| 5,534,913 | 7/1996 | Majeti et al. . |
| 5,537,141 | 7/1996 | Harper . |
| 5,539,471 | 7/1996 | Myhrvold et al. . |
| 5,543,849 | 8/1996 | Long . |
| 5,553,221 | 9/1996 | Reimer et al. . |
| 5,564,073 | 10/1996 | Takahisa . |
| 5,570,295 * | 10/1996 | Isenberg et al. ............. 364/514 R |
| 5,572,442 | 11/1996 | Schulhof et al. . |
| 5,585,858 | 12/1996 | Harper et al. . |
| 5,589,892 | 12/1996 | Knee et al. . |
| 5,604,452 * | 2/1997 | Dedrick .................... 348/6 X |
| 5,612,730 | 3/1997 | Lewis . |
| 5,633,918 | 5/1997 | Mankovitz . |
| 5,640,193 * | 6/1997 | Wellner ........................ 348/7 |
| 5,643,088 | 7/1997 | Vaughn et al. . |
| 5,649,284 | 7/1997 | Yoshinobu . |
| 5,659,366 | 8/1997 | Kerman . |
| 5,667,708 | 9/1997 | Glass et al. . |
| 5,668,592 | 9/1997 | Spaulding, II . |
| 5,694,163 * | 12/1997 | Harrison ....................... 348/13 |
| 5,696,905 | 12/1997 | Reimer et al. . |
| 5,724,091 | 3/1998 | Freeman et al. . |
| 5,724,103 | 3/1998 | Batchelor . |
| 5,729,252 | 3/1998 | Fraser . |
| 5,734,437 | 3/1998 | Back . |
| 5,761,602 | 6/1998 | Wagner et al. . |
| 5,774,664 | 6/1998 | Hidary et al. . |
| 5,778,181 | 7/1998 | Hidary et al. . |
| 5,818,441 * | 10/1998 | Throckmorton et al. ........ 348/13 X |
| 5,912,700 * | 6/1999 | Honey et al. ................. 348/157 |

\* cited by examiner

MEDIA ONLINE SERVICE ACCESS SYSTEM AND METHOD

This is a continuation of Ser. No. 08/597,432, filed Feb. 8, 1996 now U.S. Pat. No. 5,761,606.

The present invention relates to an electronic information access system and more specifically to a media online services access system which provides direct, automated access to an online information provider through an address embedded in an electronic signal which carries a program segment (e.g., through television, radio, or a pre-recorded video or audio medium).

BACKGROUND OF THE INVENTION

Heretofore, media receiving and display systems such as television and radio receivers have been linked to interactive information providers in only very limited ways. Some systems exist which permit the exchange of digital information with the viewer of a television program over or in combination with a television signal, but such systems have provided access to a single information source available from, for example, the broadcast or cable television operator. In such systems, the selection of information services has been entirely within the control of the broadcast or cable television operator. At the same time, some television and radio broadcasters have begun announcing an Internet address for viewer inquiries during the course of program transmission. Access to this Internet address requires the user to utilize his or her computer. No system yet exists which provides automated and direct user access to online information providers through an address embedded in a video or audio program signal.

The recent explosion in the usage of online information services through digital networks such as the Internet, Prodigy (R), America Online (R) and Compuserve (R), for example, indicate that the demand for access to readily available up-to-date or detailed information is increasing. The viewer of a video program, whether the program is received through broadcast, or cable means or from a pre-recorded medium, may often seek to discover more information which relates to a topic presented in the video program. Since television programs and recordings are of finite length, they do not contain all the related information which a consumer may wish, and the information contained therein may not be timely. Therefore, it would be desirable for there to be a system which automatically and directly provides access to an online information provider through an address which can be extracted from an audio or video program such as a television program, commercial or news story. With such system, several benefits would be obtained. For example, adults and children viewing an educational or historical video program could easily locate additional materials provided in text or still picture by the producers of the video program by accessing more information from the producers digitally through the online address. Consumers seeking more information about a specific advertised product could easily find such information by accessing the online address of an information provider designated by the advertiser. News program viewers seeking specific information from news stories or more detailed information could easily access such information through an online information provider designated by the producers of such program.

The online services access system could be used to provide still other benefits to consumers, business owners, and the government. For example, an automobile manufacturer could make information available directly to a consumer through an online address embedded in a video presentation so the consumer could reach its online site quickly to ask for more information, to request a test drive, or to purchase parts. Through such system, a grocery store could advertise and receive orders through its online site from customers for home delivery, or for other shopping needs. A catalog retailer could use such system to provide rapid access to consumers, after airing a commercial, to its catalog in online form and to enable orders to be placed readily through its online site. A record company could use such system to enable customers to order a recording while listening to a song or viewing a music video. Government agencies, e.g., the Internal Revenue Service, military recruiters, or health agencies, for example, could use such system to provide consumers with readily available information following the airing of public service announcements regarding regulations, programs, or public health concerns, e.g., cancer, AIDS, and heart disease. Educators and students could use such system to obtain more detailed or up-to-the-minute information from online bulletin boards and databases regarding topics presented in a video program, even though the program was recorded some time in the past.

Systems exist at present in which digitally encoded information is transmitted and received through a modified video signal of a conventional television transmission. For example, a system is described in U.S. Pat. No. 4,894,789 wherein a digital information signal is transmitted during the vertical blanking interval of an analog broadcast television signal and decoded and displayed on the television screen in addition to the analog broadcast video signal.

U.S. Pat. No. 5,128,752 describes a system in which a retailer broadcasts information for reception upon a conventional television set regarding products available through a central location. The system includes a decoder for displaying the product information on the television screen, and also a token generator for producing tokens, at the user's option, to be redeemed when a product is purchased. The broadcast information includes data related to token redemption and value considerations available upon purchase of the product.

U.S. Pat. No. 5,285,278 describes a system in which coupon-related digital information is received from a transmitted television signal through a decoder. The decoder records the coupon-related data for later readout and redemption when a product is purchased.

U.S. Pat. No. 4,905,094 ("the '094 Patent") describes an interactive cable television system in which a subscriber tunes to a channel and requests connection to a remote location by either dialing a predetermined telephone number or accessing a cable television channel. When the system identifies the subscriber the television set displays the frame of video (and possibly accompanying audio information) describing products or services which may be viewed and purchased. The '094 Patent does not describe the extraction of encoded address information from the television signal, or a system enabling a television program viewer to access online information providers by establishing connection automatically through such extracted address.

Thus, systems exist which are capable of providing interactive user access through a broadcast or cable television signal. However, such systems are limited in the access they provide to information sources directly available through the unitary cable or broadcast provider. By contrast, the present invention facilitates direct automated user access to an unlimited number of online information providers through provider addresses which are embedded in the electronic signal which carries an video or audio program.

Accordingly, it is an object of the invention to provide a system for extracting an address of an online information provider from an electronic signal which carries an video or audio program.

It is a further object of the invention to provide a system which indicates to the program user (i.e., viewer or listener), after extracting an online information provider address, that more information is available.

Still another object of the invention is to provide an automated system which, upon receipt of a single user command, directly and automatically establishes a digital connection with an online information provider through an address extracted from an electronic signal which carries a video or audio program.

Another object of the invention is to provide a system which converts information signals received from an online information provider to a form capable of being displayed on a conventional reproducing system such as a television set.

These and other objects are provided by the media online services access system of the present invention.

SUMMARY OF THE INVENTION

The media online services access system of the present invention provides a system and process which links video and audio program content with online information signal content. The system provides heretofore unattained direct automated user access from a media program such as a received or pre-recorded television or radio (audio) signal to an online information provider through a link provided in the media program. The access system receives an electronic signal representing a video or audio program or a combined audio/video program from an available medium (e.g., broadcast and cable television and radio, or a pre-recorded medium such as a tape or disc). Embedded in the electronic signal, for example, in the vertical blanking interval, or otherwise encoded in the electronic signal in such manner as not to interfere with the displayed image, is an information signal representing an electronic address of an online information provider. The online information provider can be any one of millions of interactive information providers which can be accessed through exchange of digital information signals, for example, a publisher who is available through the Internet for interactive transactions. As the media program is received for reproduction on a video display or audio sound system, the access system extracts the embedded electronic address for use in directly accessing the online information provider at the selection of the user.

Preferably, the address is stored at the time of extraction, for use in accessing the online information provider at the selection of the user. The duration in which an extracted signal address is stored may be relatively short, as in the case where the address is transmitted and refreshed continuously or at very short intervals, e.g., once per each frame of a video signal, or it may be longer, as when an address is transmitted only at selected intervals of a program.

Upon successfully extracting an electronic address, the access system provides a indicator signal to the user that more information is available. The indicator signal may take the form of a message displayed on a video screen, or other indicators such as a light, a sound or a wireless tactile indicator, e.g., vibrating wristband or clip-on unit. Alternatively, the video or audio program may contain a logo or message to be displayed for the user at points in the program which coincide with the presence of an embedded online information provider address, which, in such case, would eliminate the need for the access system to incorporate specific structure to provide indication to the user, in response to successful extraction of an online provider address.

After receiving the indicator signal, if the user desires more information, the user may request access to the online information provider through a command to the access system, e.g., through pushbutton, user control keypad, voice command, mouse, touchpad, touchscreen, or other such input. Upon receiving such command, the access system automatically establishes a digital communication link with the online information provider through transmission of a signal containing the extracted address. Preferably, upon establishment of such communication link, the access system enables interactive communications with the online information provider.

In another embodiment of the invention, the extracted address can be used without first being stored, as in cases where a connection already exists between the access system and a network. Where such connection exists, the access system provides an indicator signal to the user upon successful extraction of an online information provider address. However, in this embodiment, the access system waits to receive a user command to initiate access, and only after receiving such command does the access system extract the next received address from the electronic signal and use it to establish a direct connection to the online information provider.

In a preferred embodiment, after accessing an online services provider, the access system receives information from the online information provider and processes it for reproduction on a video or audio reproducing system. For example, the information can be displayed on the television screen in place of the television broadcast signal, on a separate computer monitor or other display device, or together with the television broadcast signal in a picture-in-picture format. In this way, the user can fully explore all of the related information available from the online information provider. Preferably, the access system is provided with hardware to reformat the received information signal for display upon an otherwise incompatible system, for example, to convert a digitally encoded video signal to an analog signal for reproduction on a conventional television set. Preferably, the access system is also provided with hardware for receiving and processing user commands for transmission to the online information provider for providing user communication transactions with the provider.

DETAILED DESCRIPTION OF THE PREFERRED EMBODIMENTS

Figure 1:
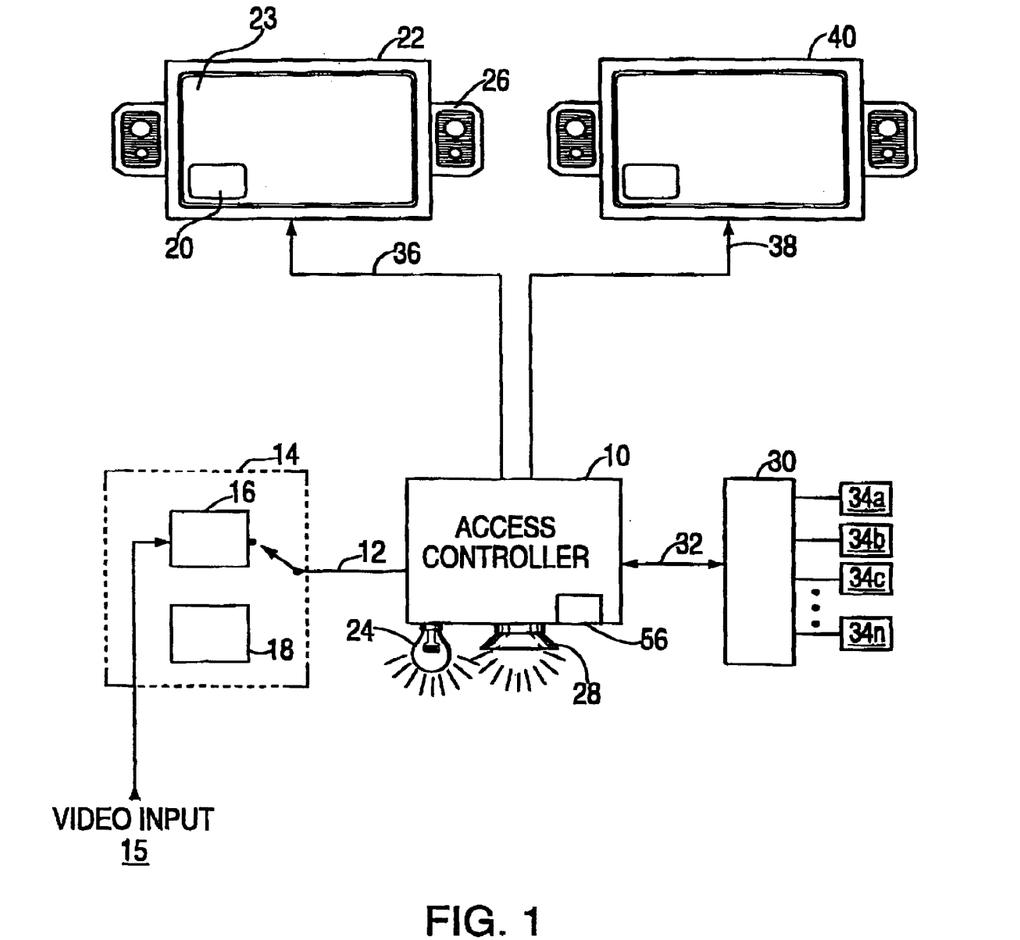
FIG. 1 is a block and schematic diagram illustrating the online services access system in accordance with the present invention.

An online services access system according to the present invention is illustrated in FIG. 1. Referring to FIG. 1, the online services access system includes access controller 10 which incorporates all components necessary to provide online access and to access received online information signals. Access controller 10 is constructed to receive an electronic signal 12 from a broadcast, cable or prerecorded medium program in conventional form from a video signal source 14. Video signal source 14 can be selectively switchable to provide output from a channel selector 16 connected to a cable or broadcast video input 15 or from a video playback system 18 which may be, for example, a videocassette recorder or an analog or digital videodisc device. It will be appreciated that channel selector 16 may be provided in a unit separate from playback system 18, or within access controller 10 itself. Alternatively, access controller 10 can be constructed to receive and decode program signals at radio frequency as received from a broadcast or cable video source, or as downconverted to baseband, by for example, the front end receiving circuitry of a video cassette recorder or digital video disc device. It will also be appreciated that the function and results provided by access controller 10 are not dependent upon which of many available playback systems is connected thereto, whether such systems are analog or digital in format, or whether such playback systems operate upon videotape, audiotape, or disc media.

Access controller 10 is connected via a primary output signal line 36 to a conventional reproducing system 22 such as a television set, and is optionally connected through a second output signal line 38 to a high resolution reproducing system 40, such as a computer monitor. In addition, access controller 10 is connected to a public or private network 30 through an information signal carrier 32, e.g., telephone line, coaxial cable, fiber optic link, cellular, radiotelephone, or satellite link. Network 30, which may be any private or public local area network or wide area network such as an office network, company network, public Internet or circuit-switched network is used to route address and information signals between access controller 10 and a selected one of a plurality of online information providers 34*a*, 34*b*, 34*c*, . . . 34*n*. Access controller 10 receives from the online information provider, through network 30, information signals having a video or audio program content and selectively provides, through appropriate conventional processing, a conventional program signal or a high resolution signal for reproduction upon standard reproducing system 22, or high resolution reproducing system 40, respectively.

The internal construction of access controller 10 is described with reference to FIG. 2. Access controller 10 is provided with an address extractor 42 which receives the electronic signal 12. Address extractor 42 includes hardware and/or software to detect, decode and store an address which has been embedded in a video or audio program signal. Among the ways which exist to detect an address signal transmitted in conjunction with an analog video signal, address extractor 42 may be constructed to detect a digital address which is transmitted during a vertical blanking interval or other portion of a conventional video signal in such manner that displayed image quality is not affected. For example, the address signal can be transmitted during a portion of a video signal such as in the vertical interval, in sync or through changes in the luminance or chroma signals. Address extraction 42 is constructed to electronically store, e.g., via a register or memory device (not shown), the detected address for use in accessing the online services provider at the selection of the user. The address signal may be transmitted at very short intervals, e.g., once for each frame of a video program such that storing and refreshing of the extracted address signal occurs at very short intervals. Alternatively, the address signal may be transmitted at longer intervals, i.e., at discrete intervals in a program such that the duration in which an extracted address signal is stored is much longer.

In such cases in which video or audio program is encoded digitally, address extractor 42 may be constructed in any of several existing ways to detect an address signal which is received in conjunction with a digitally encoded video or audio electronic signal 12. The details of the construction of address extractor 42 are well known in the art and need not be described in further detail.

Address extractor 42 has an output connection to an indicator signal generator 46. The indicator signal generator 46 signals the user that more information relating to the program is available, such information being accessible through an electronic address when address extractor 42 has decoded such address from the electronic signal 12. Indicator signal generator 46 causes, for example, a video image 20 (e.g., picture within picture, logo, or icon) to be displayed with the video program signal on reproducing system 22 to signal the user that an address of an online provider has been stored and that additional information is available. Instead, or in addition to such visual display, indicator signal generator 46 may signal the user by activating a light 24 or other visual indicator located on an exterior panel of access controller 10 or of reproducing system 22. Alternatively, indicator signal generator may cause a sound to be produced on a speaker 26 of reproducing system 22, or by a speaker 28 provided in access controller 10. Here again, the design of indicator signal generator 46 is well known in the art.

Access controller 10 is provided with a user input interface 56 for receiving a user command which automatically initiates establishment of a direct digital communication link to an online information provider through an address detected from the electronic signal 12 by address extractor 42 and permits interactive communication between the user and the online information provider. It will be appreciated that many conventional input interfaces are well suited for use as user interface 56 because of their compatibility with conventional television and audio sound systems. Among such input interfaces are infrared, radio and audio frequency interfaces which decode single key or multiple key sequence input from a wired or wireless remote user control. Preferably, user input interface 56 detects when a special purpose button on a remote user control has been pressed and provides a responsive signal which automatically causes the stored address of the online provider to be retrieved and transmitted. User input interface 56 can also be constructed to detect when a special sequence of keys has been pressed on a conventional user control (e.g., a sequence such as "ENTER," "ENTER," "+VOLUME") and to enable interactive communication with the online information provider. Alternatively, user input interface 56 can be implemented by any appropriate microcomputer type user interface, e.g., mouse, touchpad, touchscreen, trackball, joystick, pushbutton, eraser head, or other such device. Preferably, user interface 56 is constructed to provide and receive transmission of digital information signals through modem 54 to the online information provider, thereby enabling interactive user access with the online provider for conducting detailed information searches, conducting transactions, and sending or posting messages to the accessed provider.

Access controller 10 is provided with a modem 54 for transmitting and receiving digital information signals between access controller 10 and public switching network 30 through an information signal carrier line 32. Modem 54 demodulates incoming information signals and outputs them to processor 58 which extracts a video and/or an audio signal 38. Preferably, access controller 10 includes a signal converter 62 for adjusting or converting an incompatible signal for display upon conventional reproducing system 22, such as a television set, either in place of the television signal, superimposed over the television signal, or in picture-in-picture format, as controlled by the user. Alternatively, processor 58 provides the video signal on line 38 to a high resolution reproducing system 40, such as a computer monitor. Indicator signal generator 46 may also incorporate a switch (not shown) which automatically switches off the primary output signal 36 whenever a signal appears at the output of signal converter 62. In this manner, information signals received from online information providers will be automatically displayed on conventional reproducing system 22 in place of the ordinarily displayed video signal 36. Processor 58 can also receive the input video or audio electronic program signal through a line 55 output from address extractor 42 (although direct connection of the electronic signal line 12 is possible). In this manner, processor 58 may be constructed to operate upon the video or audio signal in conjunction with information signals received from an online information provider to generate a "picture within picture" signal for display upon conventional reproducing system 22.

The operation of the system will now be described. An electronic signal 12, such as a signal from a video or audio program from channel selector 16 or playback system 18, e.g., prerecorded videotape, or an analog or digital video disc, containing an embedded signal representing the electronic address of an online information provider in the blanking interval or other non-displayed portion of the electronic signal 12 is received by address extractor 42. From the electronic signal 12, address extractor 42 detects, decodes and stores a digital address of the online services provider, if any such address is embedded therein. If an address is successfully decoded and stored, address extractor 42 activates, through signal line 44, indicator signal generator 46. Indicator signal generator 46 then produces an indicator signal and overlays or encodes it onto a conventional program signal 36 to be displayed or transduced by conventional reproducing system 22. Alternatively, indicator signal generator 46 produces a signal on line 50 which activates a special purpose indicator, e.g., illuminating a light 24 or producing a sound on a speaker 28 of access controller 10.

If the user wants to access the online information provider, the user gives such command to access controller 10 by, for example, pushing a special button on his or her remote control device. The remote control device transmits a command signal to user interface 56 which receives the command signal. User interface 56 in turn, produces a signal which is applied to address extractor 42 to retrieve the stored address of the online information provider. Under appropriate software or hardware control, the address is transmitted via modem 54 over network 30 to an online information provider, e.g., 34c.

Once access to the online information provider has been established, access controller 10 can automatically receive digital information signals through modem 54 from the online information provider. Received information signals are operated upon by processor 58 for displaying upon conventional TV reproducing system 22 or high resolution reproducing system 40, e.g., a computer monitor or other display device. Preferably, received signals which are incapable of being directly displayed upon conventional reproducing system 22, e.g., a conventional television set, are converted by a signal converter 62 for display thereon. Information signals received from an online information provider may be displayed as still or moving images in place of the ordinarily displayed video signal on the conventional reproducing system 22, or may be displayed as part of a "picture within picture" display in conjunction with the ordinarily displayed video signal on conventional reproducing system 22 or on the computer monitor 40 or other display device.

After access has been established, user commands received through user interface 56 are transmitted as information signals through modem 54 to the online information provider, thereby providing interactive user access with the online provider and enabling searching for detailed information, conducting transactions, sending or posting messages to the accessed provider and any other actions that can ordinarily be conducted through an online connection.

Figure 2:
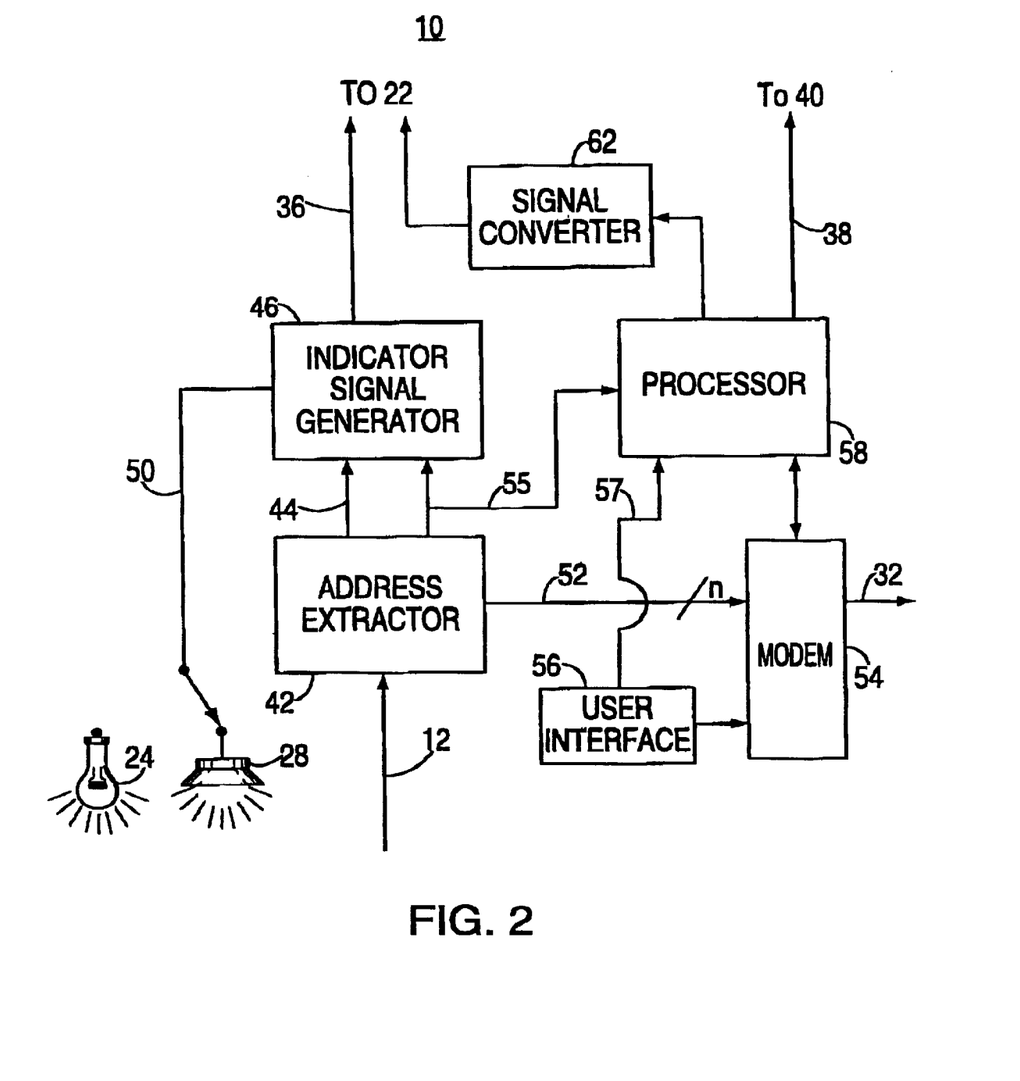
FIG. 2 is a block and schematic diagram of an access controller used in the online access system of FIG. 1.
Figure 3:
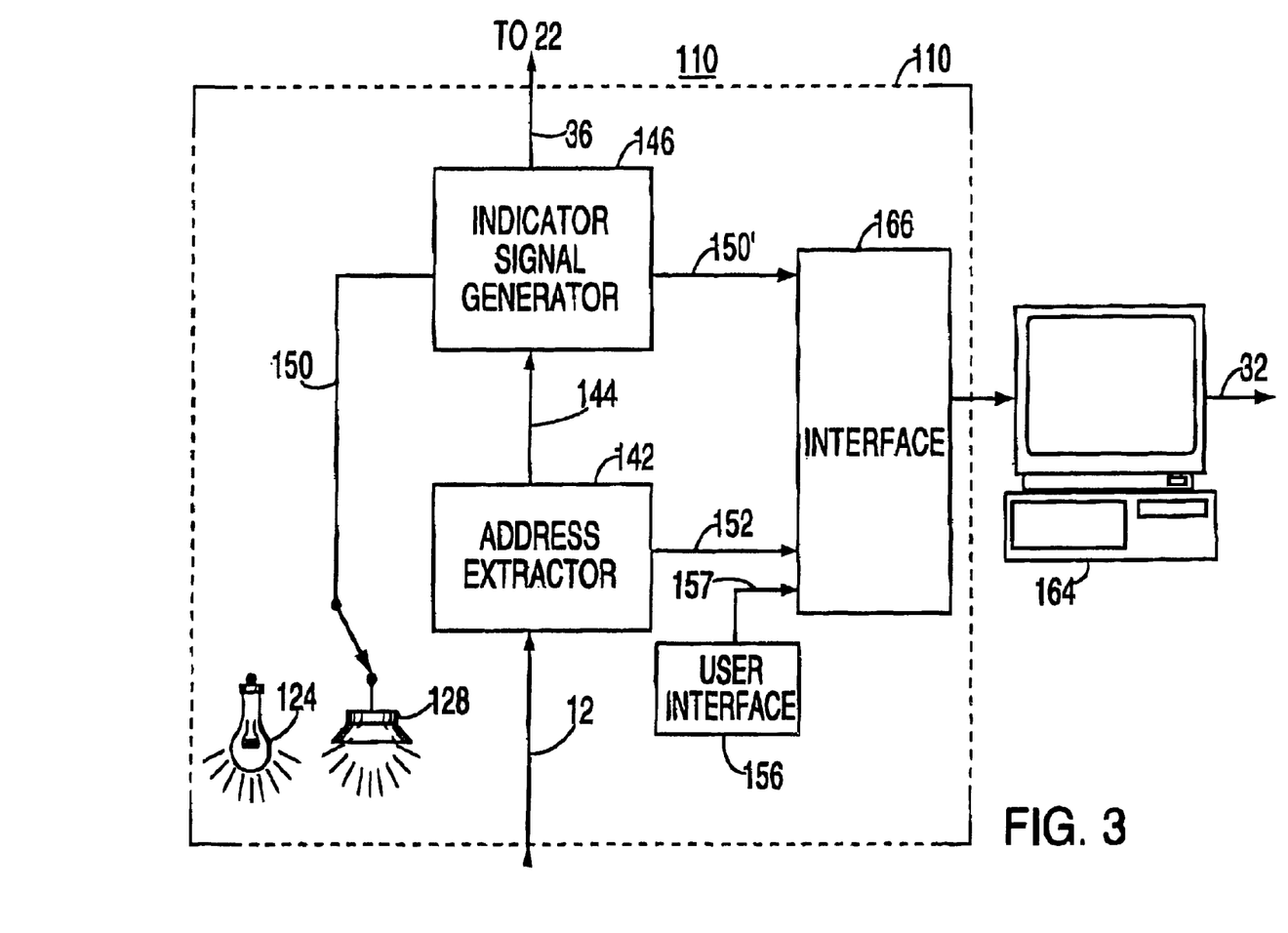
FIG. 3 is a block and schematic diagram of another embodiment of an access controller used with a computer in accordance with the present invention.

Another embodiment of the invention is illustrated in FIG. 3. FIG. 3 shows an embodiment which operates in conjunction with an available computer 164. In this embodiment, access controller 110 does not require an internal processor or modem because such functions are provided by a computer 164 attached thereto. In addition, computer 164 also provides a monitor and audio reproducing components which function as high resolution reproducing system 40. Address extractor 142, indicator signal generator 146, and user input interface 156 of access controller 110 are connected through an output interface 166 for providing decoded address output, indicator signals, and user commands, respectively, to computer 164. In other respects, access controller 110 is connected to receive an electronic signal 12 and provide a conventional program signal 122 and a signal 150 to indicator 124 or indicator 128, in like manner as in the self-contained embodiment of access controller 10 described in the foregoing (FIG. 2). It will be appreciated that the computer supported embodiment of the invention (FIG. 3) provides the same function and operates in essentially the same manner as the self-contained embodiment (FIGS. 1–2) and need not be described in any further detail.

In still another embodiment of the invention, with reference to FIGS. 1–3, a connection to network 30 is maintained continuously by access controller 10 through modem 54 or the modem provided in computer 164. This embodiment will be described with reference to the access controller 10 shown in FIG. 2, although the skilled person in the art will readily understand the structural modifications required for operation in accordance with the access controller shown in FIG. 3. In this embodiment, address extractor 42 detects and decodes an online information provider address embedded in the video or audio program signal, but does not store the address.

As described in the foregoing embodiments of the invention, address extractor 42 provides a signal to indicator signal generator 46 when it successfully detects an online information provider address in the electronic signal. Address extractor 42 detects and decodes the embedded address and passes it to modem 54. Modem 54, in turn, only uses the extracted address if it has first received a user command to initiate access to the online information provider. It will be appreciated that this embodiment of the invention can be used with a video or an audio program signal wherein the online information provider address is frequently or continuously transmitted. Modem 54 is provided with hardware and/or software to automatically establish, upon receiving a user command to initiate online access, a direct digital communication link with the online information provider associated with the next received online information provider address.

As an example of the operation of this non-address storing embodiment of the invention, a video or an audio program signal having a frequently transmitted embedded signal containing an online information provider address is received through line 12 by address extractor 42. Address extractor 42 detects and decodes the online information provider address, but does not store it before passing it to modem 54. Modem 54 does nothing with the online information provider address unless a user command to initiate access has first been received from user interface 56. If such user command has been received, modem 54 transmits a signal over network 30 using the next received address to establish a digital communication link with the online information provider. The function and operation of the non-address storing embodiment is otherwise the same as in the other described embodiments of the invention and need not be described in any further detail.

In yet another embodiment of the invention, automated direct user access to online information providers is achieved without incorporating an indicator signal generator 46, 146 (FIG. 3) into the access controller 10. In this embodiment, the video or audio program as produced incorporates a visual or auditory indicator, such as a logo or message, which is automatically displayed or sounded by conventional reproducing system 22 and/or high resolution reproducing system 40 during portions of the program when an online information provider address is present in the underlying electronic program signal. Through the visual or auditory indicator, the user is made aware of the availability of the online information provider address. Therefore, in this embodiment of the invention, address extractor 42 may be constructed and used in a manner so as to detect and decode an embedded online information provider address only after receiving a user command to initiate access to the online information provider. The skilled person in the art will appreciate that this embodiment of the invention operates in other respects as in the other embodiments of the invention described in the foregoing and need not be described in further detail.

While the invention has been particularly described and illustrated with reference to preferred embodiments thereof, it will be understood by those skilled in the art that changes in the above description or illustration may be made with respect to form or detail without departing from the spirit and scope of the invention.

What is claimed is:

1. A method of providing to a user of online information services automatic and direct access to online information through an address associated with an online information source provided with a video program comprising:

indicating to the user that an address has been provided with said video program; and electronically extracting said address and automatically establishing, in response to a user initiated command, a direct communication link with the online information source associated with said address so that the user has direct access to the online information.

2. The method in accordance with claim 1 further comprising using said communication link to provide interactive exchange of information between said online information source and the user.

3. The method in accordance with claim 1 wherein said step of indicating includes producing a visual indication to be displayed on the system wherein said program is displayed.

4. The method in accordance with claim 1 wherein said step of indicating includes producing an auditory indication to be sounded on a speaker where an audio portion of said program is reproduced.

5. The method in accordance with claim 1 where said step of indicating includes activating a sensory indicator on a system separate from that on which said program is reproduced.

6. A method of providing to a user of online information services automatic and direct access to online information, comprising the steps of:

receiving a television broadcast signal having an information signal representing the address of an online information source;

extracting the address of said online information source from said received television broadcast signal;

automatically using said address, in response to a user initiated command, to transmit a signal to connect said user directly with the online information source associated with said address so that the user as direct access to the online information; and receiving online information signals from said online information provider.

7. A method of providing to a user of online information services, at the time of viewing a video program represented by an electronic signal, automatic and direct access to online information through a link provided in said video program, comprising:

indicating to the user that an address is available for establishing communication with an online information source;

electronically extracting, in response to a user initiated command, an address associated with an online information source from an information signal embedded in said electronic signal, and automatically using said extracted address to establish a direct communication link with the online information source associated with said extracted address so that the user has direct access to the online information.

8. A method of providing to a user of online information services automatic and direct access to online information through a link provided in a video program, comprising:

indicating to the user that a link to online information services is available for receiving the online information; and automatically and directly electronically accessing said online information associated with said link in response to a user initiated command so that the user has direct access to the online information.

9. A media online services access system for providing to a user of online information services while viewing or listening to a video or audio program represented by an electronic signal, automatic and direct access to online information by establishing a direct digital communication link with an online information source through a link provided in said electronic signal, comprising:

means for indicating to the user that an address is available for extraction from said electronic signal which permits communication with an online information source; and means for extracting an address associated with an online information source from an information signal embedded in said electronic signal, and for automatically establishing, in response to a user initiated command, a direct link with the online information source associated with said extracted address so that the user has direct access to the online information.

10. The media online services access system in accordance with claim 9 wherein said program is a video program, further comprising:
means for receiving an information signal from said online information source; and
means for displaying an image signal detected from said received information signal.

11. The media online services access system in accordance with claim 9 wherein said indicating means comprises a visual indicator displayed on a system on which said program is displayed.

12. The media online services access system in accordance with claim 9 further comprising a user control device coupled to said system to permit said user to interactively communicate with said online information source.

* * * * *

UNITED STATES PATENT AND TRADEMARK OFFICE
CERTIFICATE OF CORRECTION

PATENT NO.   : 6,233,736 B1
DATED        : May 15, 2001
INVENTOR(S)  : Thomas R. Wolzien It is certified that error appears in the above-identified patent and that said Letters Patent is hereby corrected as shown below:

<u>Column 10,</u>
Line 22, delete the word "as" and insert -- has -- therefore.

Signed and Sealed this

Second Day of December, 2003

JAMES E. ROGAN
*Director of the United States Patent and Trademark Office*